United States Patent
Rausch

(10) Patent No.: US 9,187,249 B2
(45) Date of Patent: Nov. 17, 2015

(54) TELESCOPIC CONVEYOR BELT

(71) Applicant: BEUMER GmbH & Co. KG, Beckum (DE)

(72) Inventor: Udo Rausch, Telgte (DE)

(73) Assignee: BEUMER GmbH & Co. KG, Beckum (DE)

( * ) Notice: Subject to any disclaimer, the term of this patent is extended or adjusted under 35 U.S.C. 154(b) by 0 days.

(21) Appl. No.: 14/555,750

(22) Filed: Nov. 28, 2014

(65) Prior Publication Data

US 2015/0144465 A1    May 28, 2015

(30) Foreign Application Priority Data

Nov. 28, 2013    (DE) .................. 10 2013 018 063

(51) Int. Cl.
*B65G 21/14*    (2006.01)
*B65G 15/26*    (2006.01)
*B65G 21/20*    (2006.01)

(52) U.S. Cl.
CPC .............. *B65G 15/26* (2013.01); *B65G 21/14* (2013.01); *B65G 21/2072* (2013.01)

(58) Field of Classification Search
CPC ......... B65G 21/14; B65G 13/12; B65G 15/26
USPC .......................................... 198/588, 595, 812
See application file for complete search history.

(56) References Cited

U.S. PATENT DOCUMENTS

| | | | | |
|---|---|---|---|---|
| 1,967,921 A * | 7/1934 | Burnell | ...................... | 198/595 |
| 2,032,428 A * | 3/1936 | McCarthy | ................... | 198/595 |
| 3,127,978 A | 4/1964 | Zuercher | | |
| 3,835,980 A * | 9/1974 | Brooks, Jr. | .................. | 198/812 |
| 5,351,809 A * | 10/1994 | Gilmore et al. | ............. | 198/812 |
| 5,685,416 A * | 11/1997 | Bonnet | ...................... | 198/812 |
| 6,481,563 B1 * | 11/2002 | Gilmore | ..................... | 198/588 |
| 7,168,555 B2 * | 1/2007 | Peterson | .................... | 198/812 |
| 2006/0011455 A1 * | 1/2006 | Petersen | .................... | 198/812 |

FOREIGN PATENT DOCUMENTS

| | | |
|---|---|---|
| DE | 2254756 | 7/1973 |
| DE | 2719412 | 11/1977 |
| DE | 4006474 | 9/1991 |
| WO | 2006068443 | 6/2006 |

* cited by examiner

*Primary Examiner* — James R Bidwell
(74) *Attorney, Agent, or Firm* — Renner, Otto, Boisselle & Sklar, LLP

(57) ABSTRACT

Telescopic conveyor belt, with a base conveyor section, a telescopic conveyor section on the base conveyor section and which can be extended and retracted telescopically, in and counter to a direction of extension, an endlessly circulating conveyor belt forming a conveyor surface and which, with its carrying run, is led along an upper surface of the base conveyor section and of the telescopic conveyor section, a base guide trough closed on the underside and arranged between the conveyor belt and the base conveyor section, has a carrying area for accommodating the conveyor belt and has raised guide areas following on laterally from the carrying area, and a telescopic guide trough closed on the underside and arranged between the conveyor belt and the telescopic conveyor section and has a carrying area for accommodating the conveyor belt and has raised guide areas following on laterally from the carrying area.

20 Claims, 11 Drawing Sheets

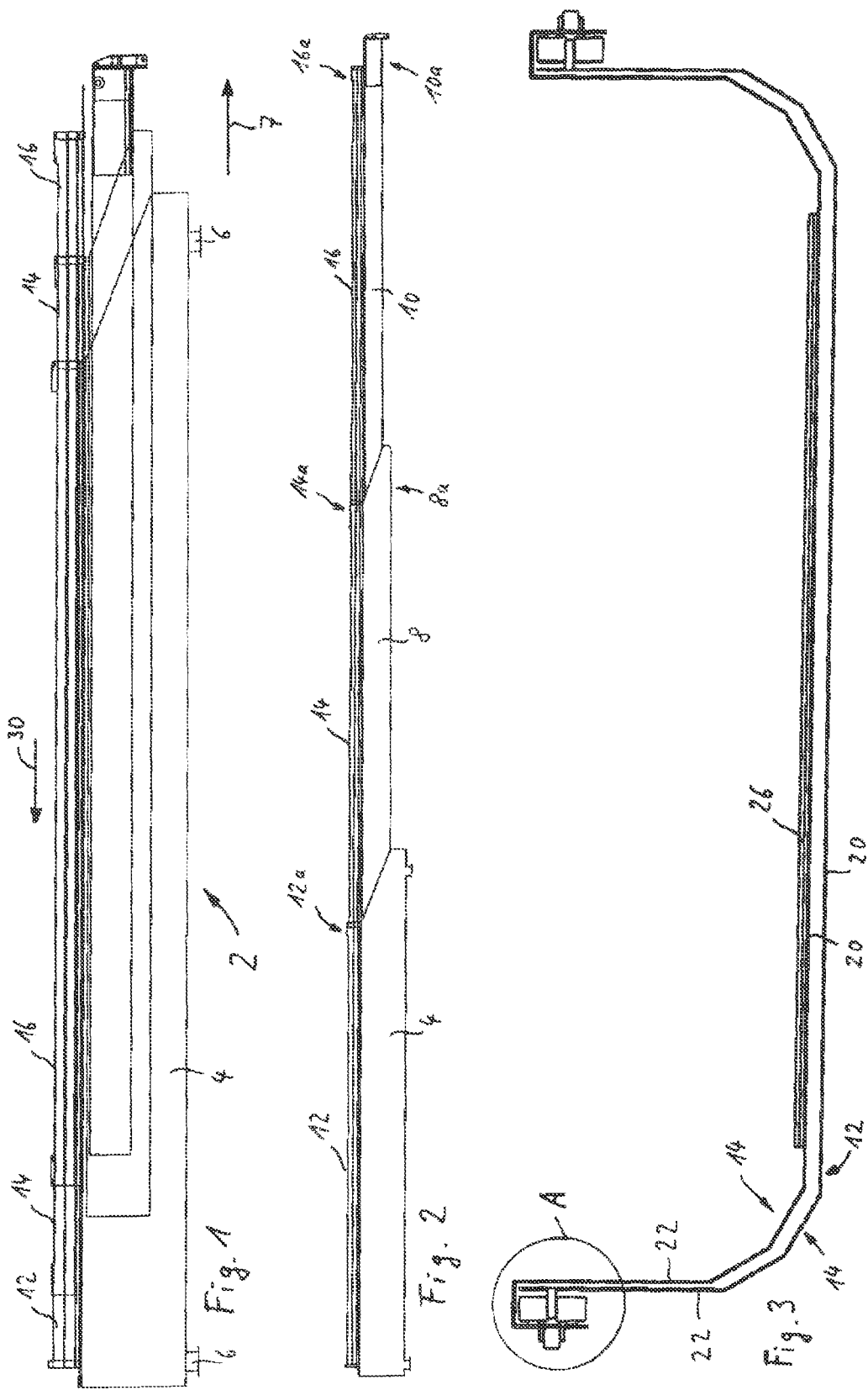

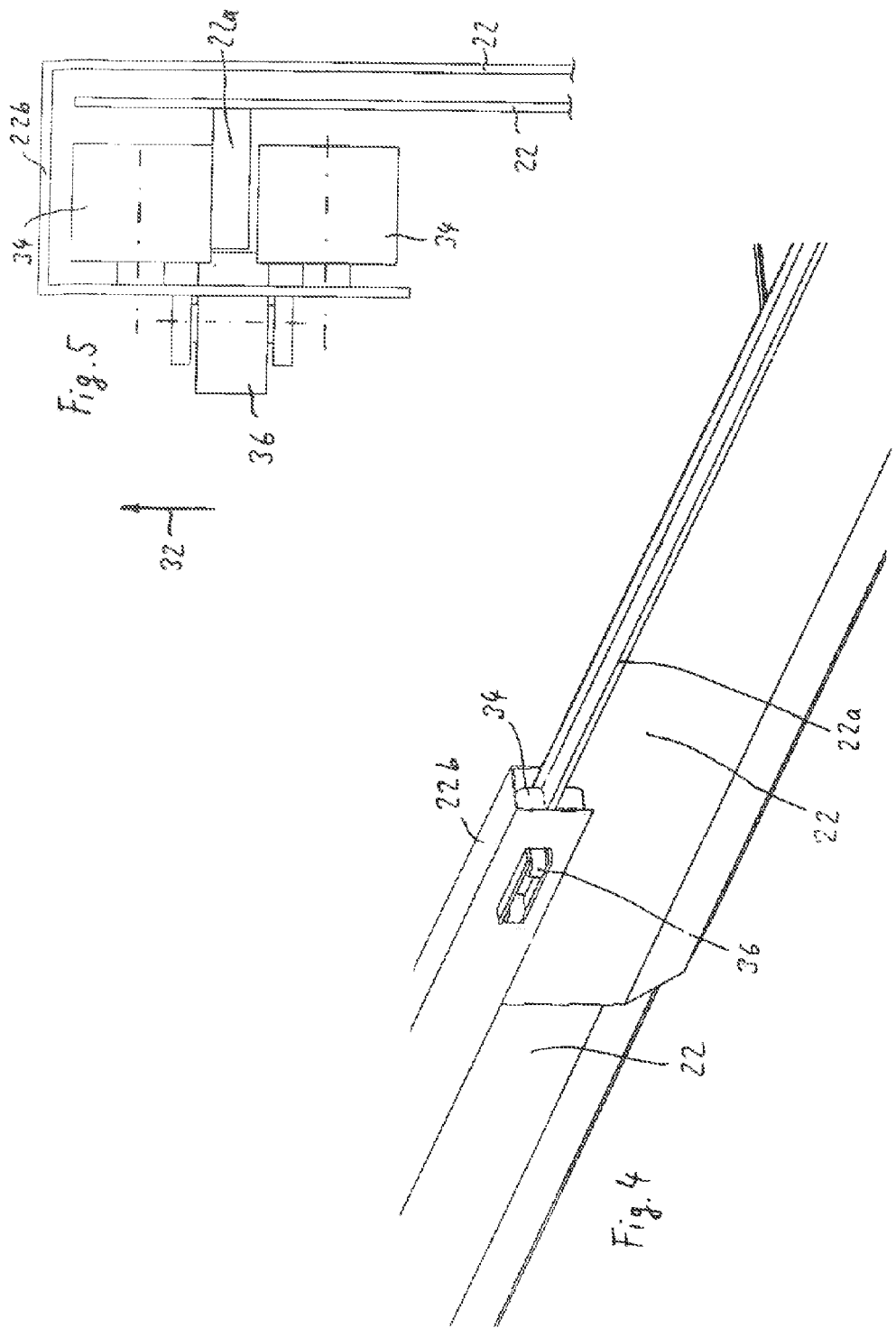

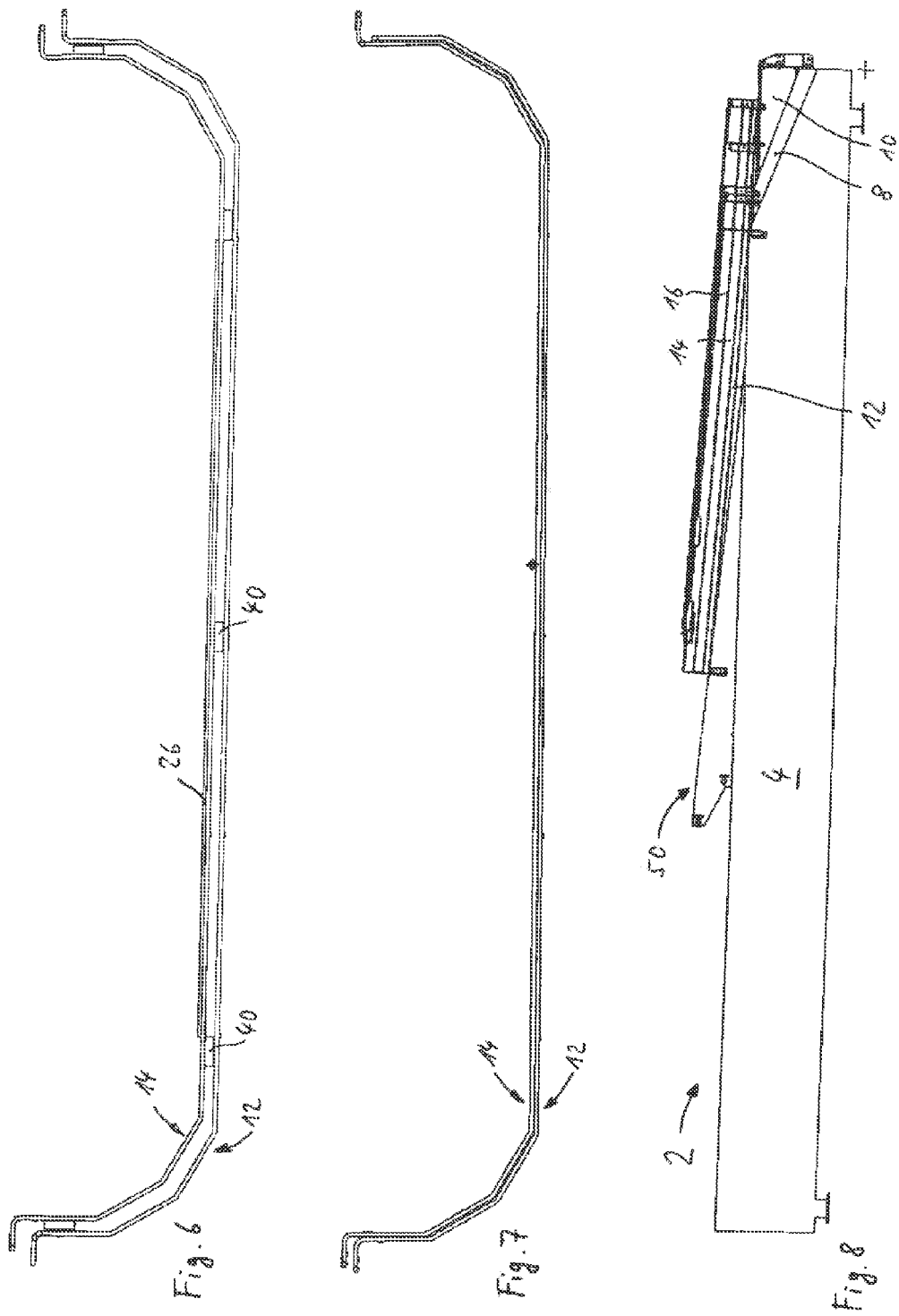

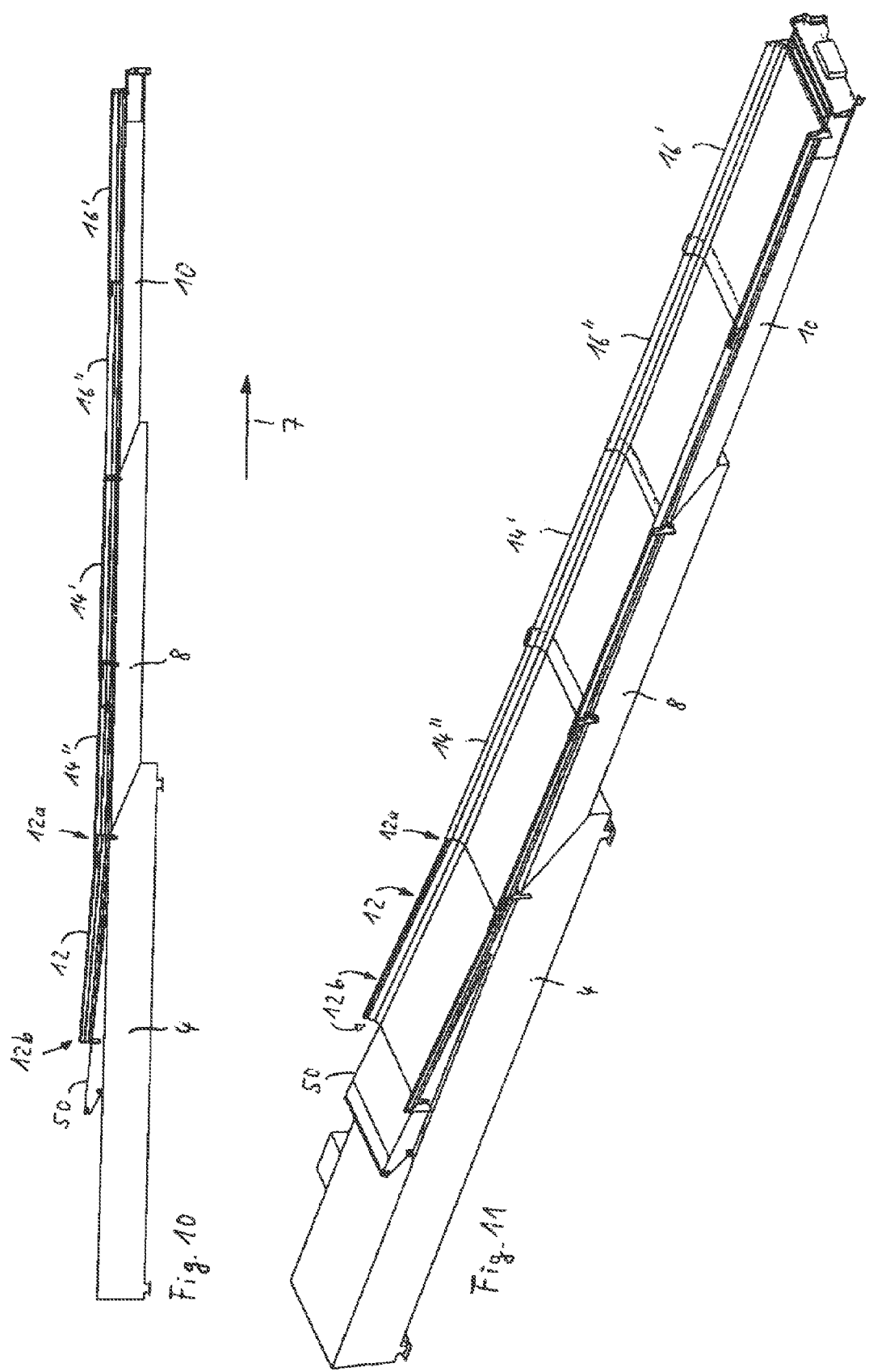

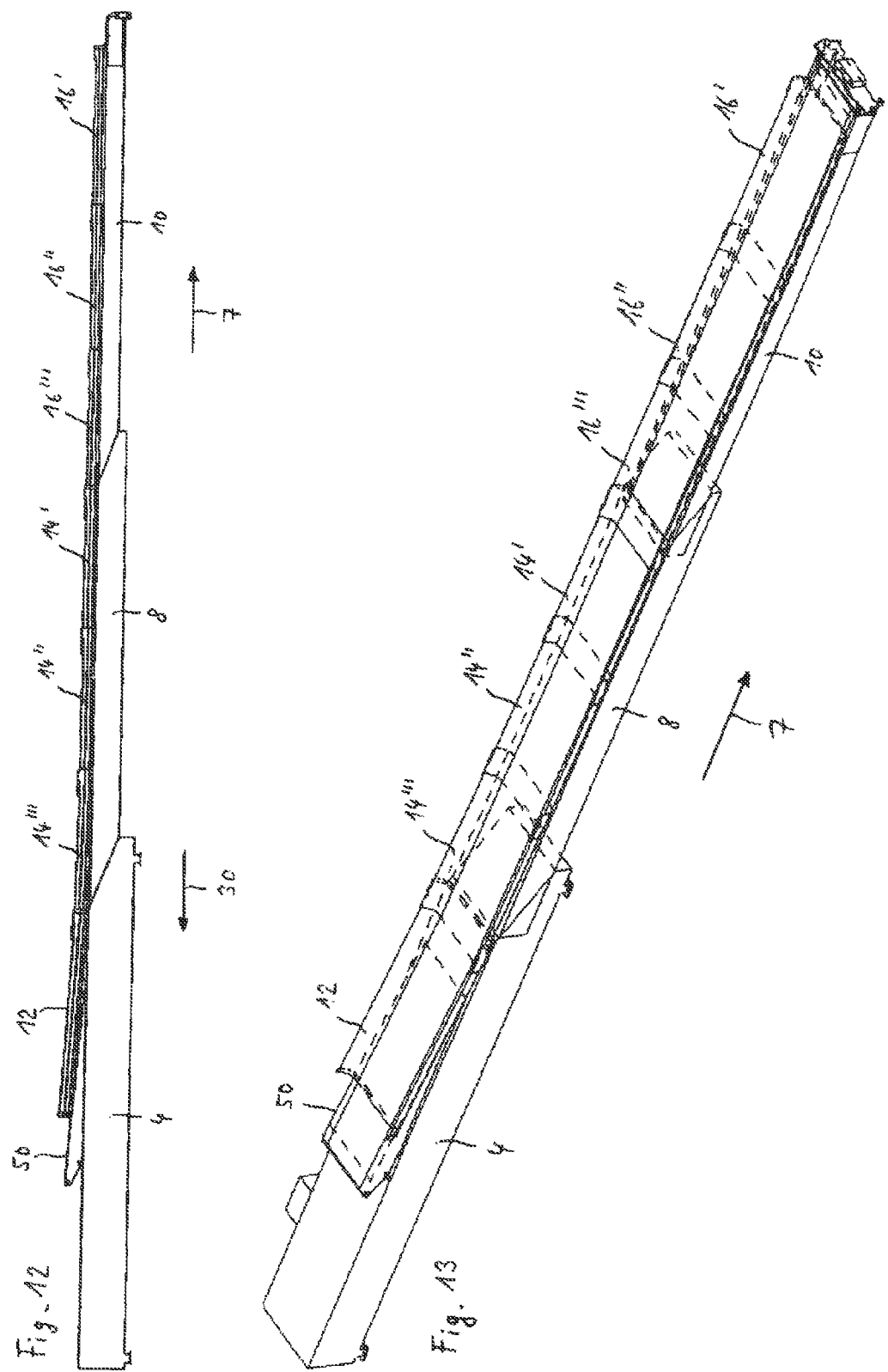

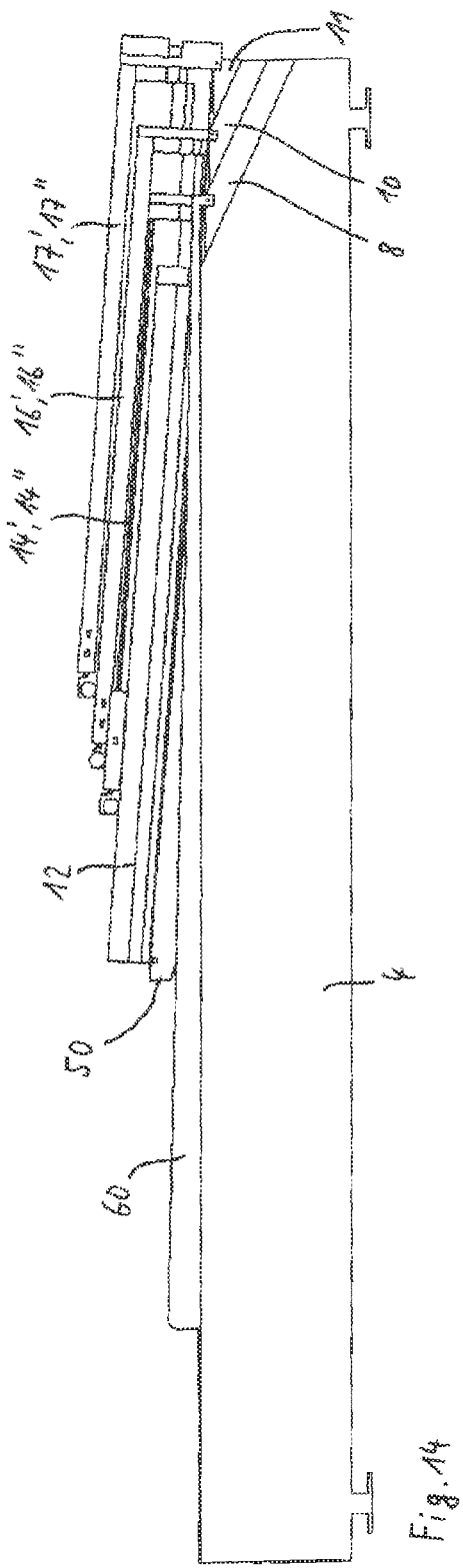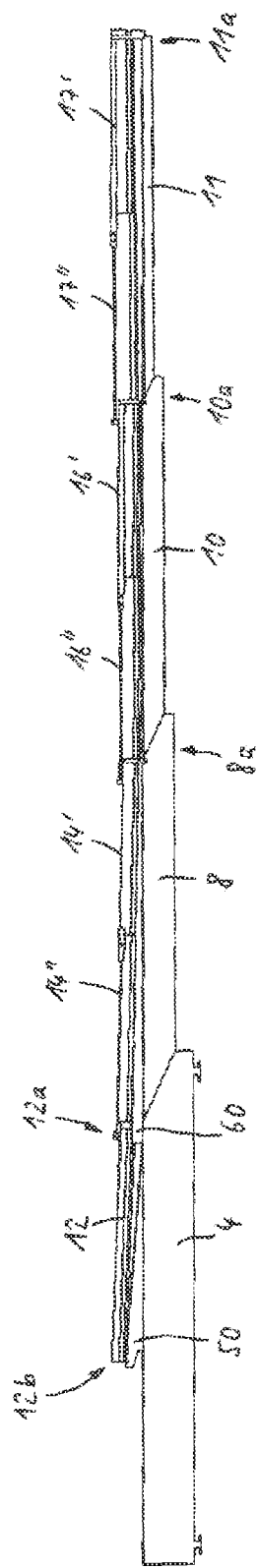

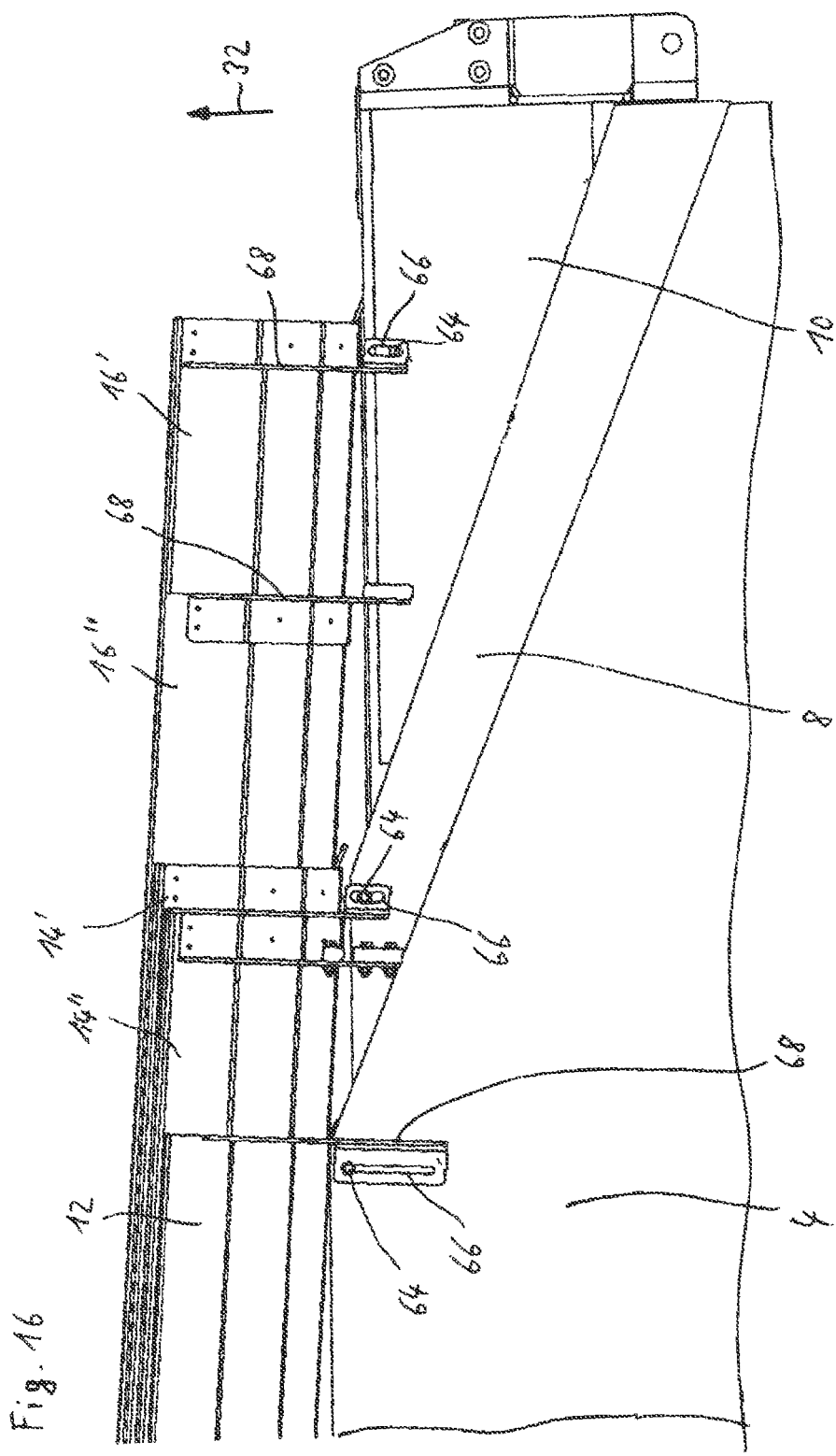

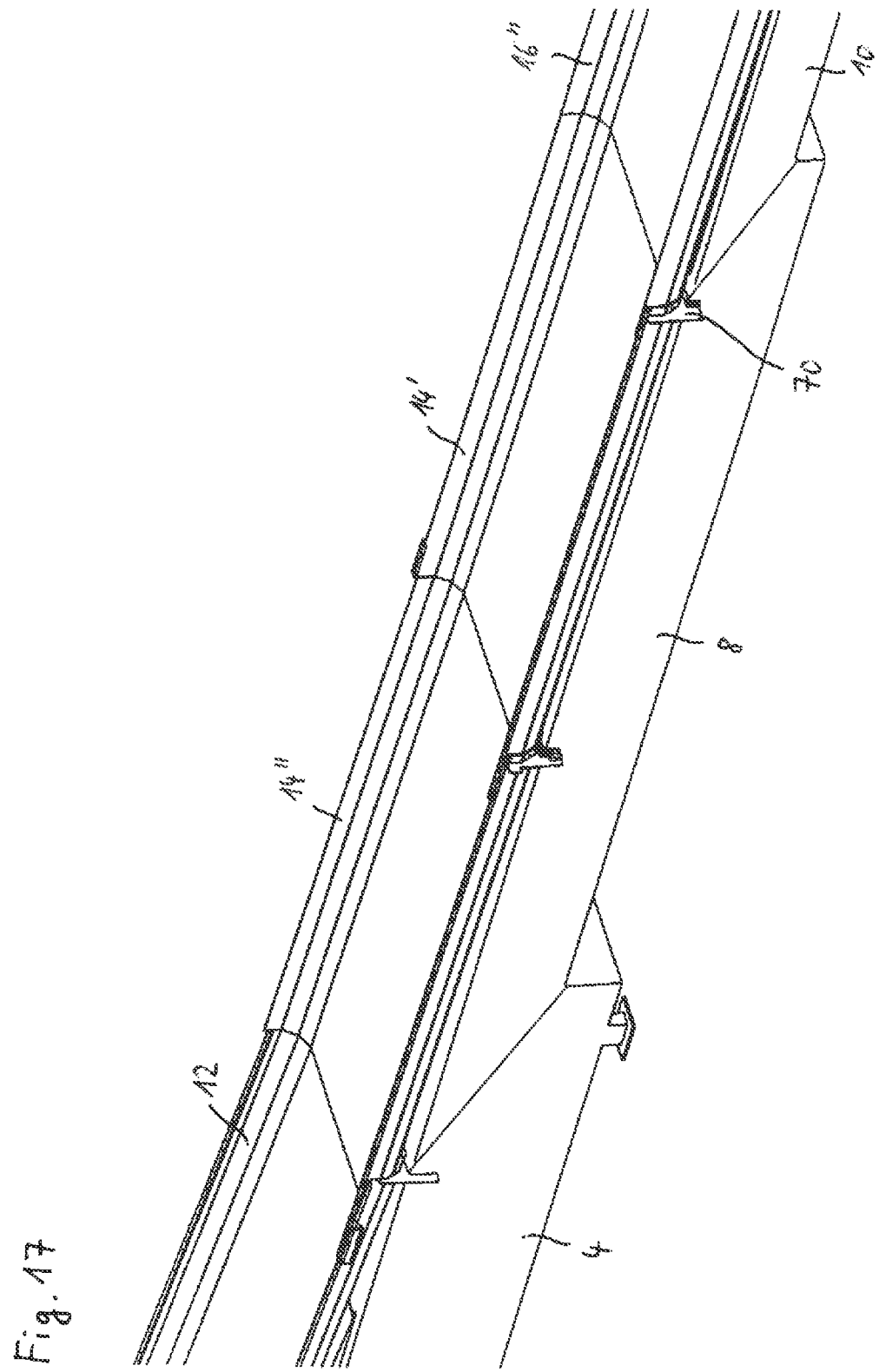

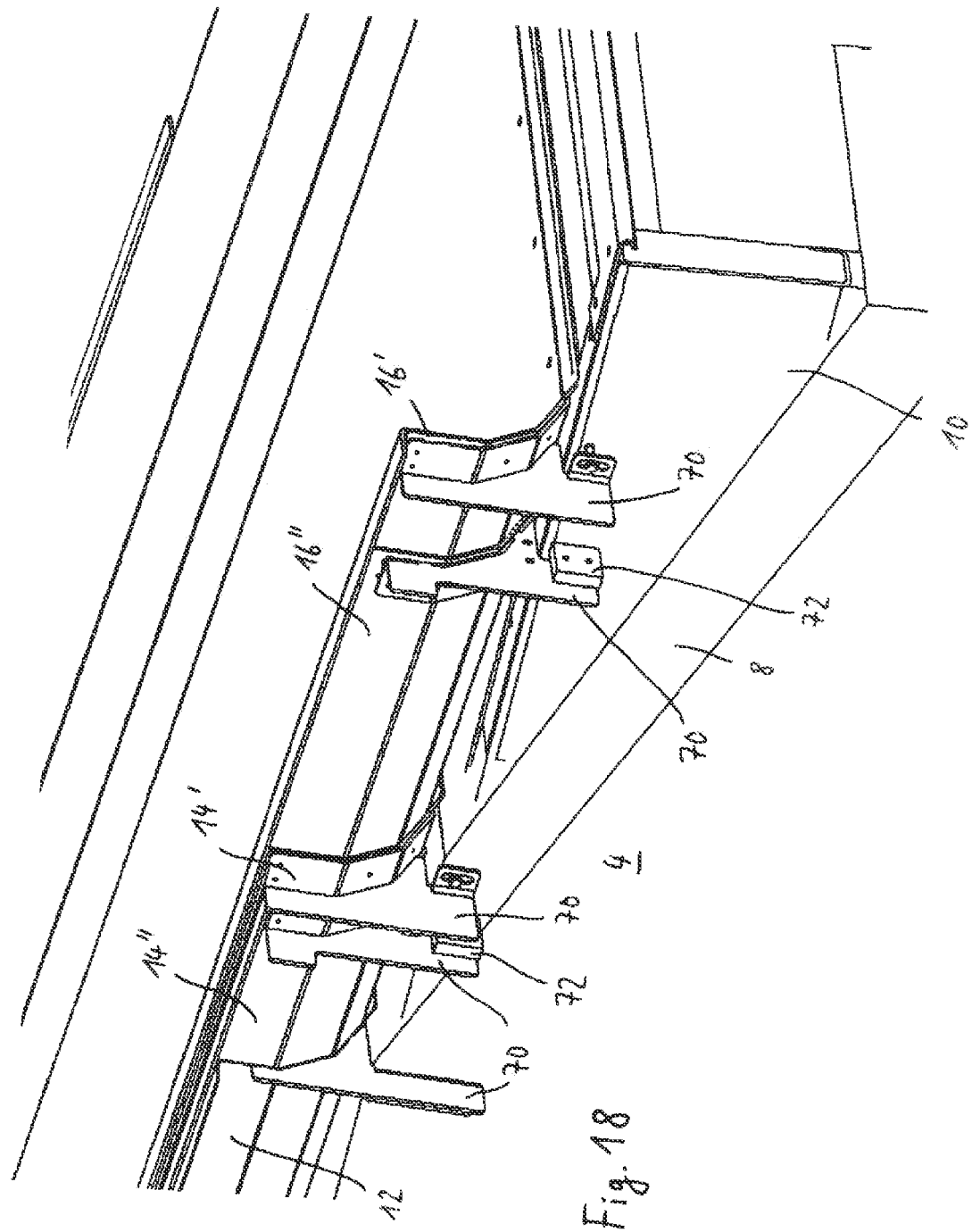

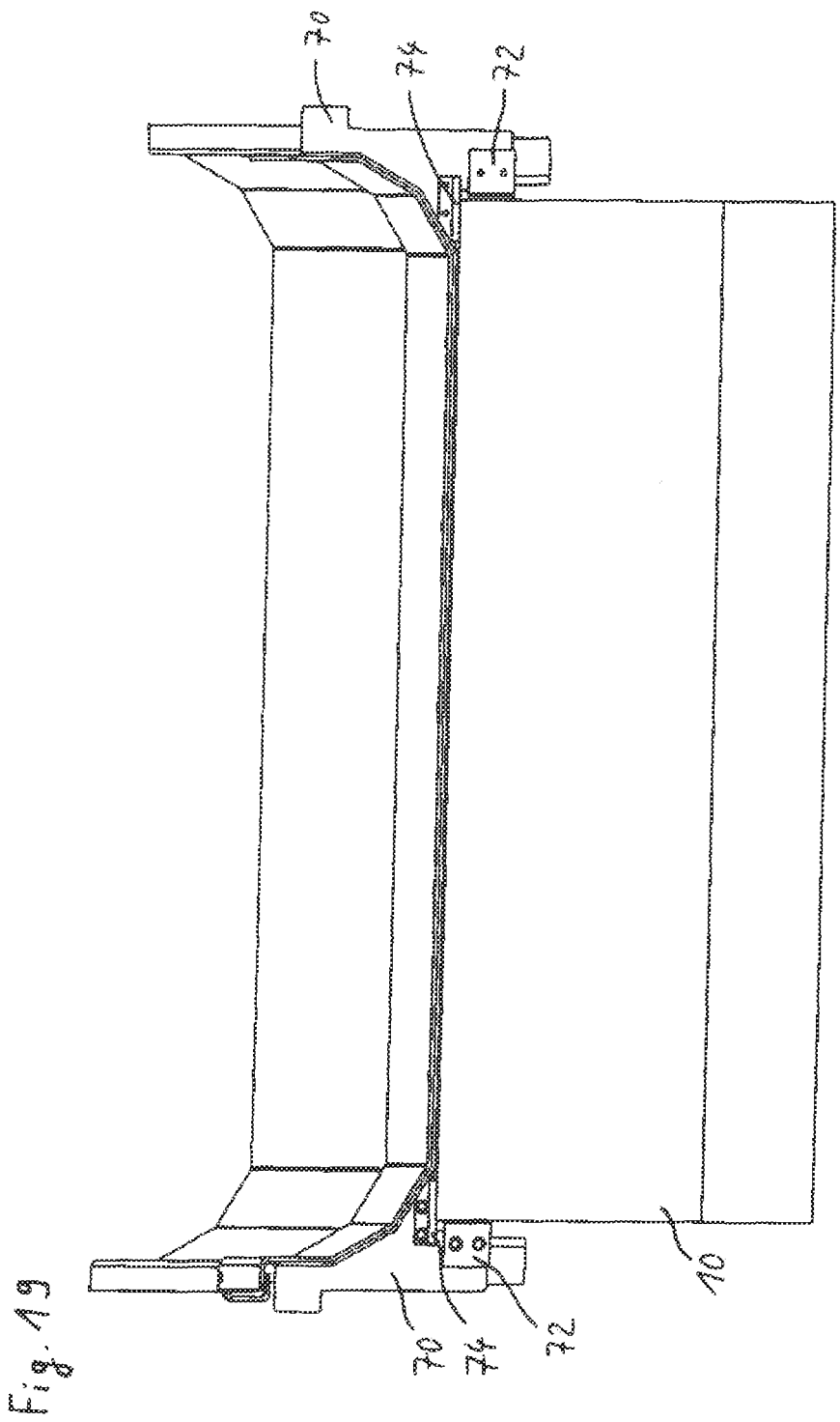

TELESCOPIC CONVEYOR BELT

CROSS-REFERENCE TO RELATED APPLICATION

The present application is related to and claims priority under 35 U.S.C. §119(a) to German Application No. 10 2013 018 063.5, filed Nov. 28, 2013, the entirety of which is hereby incorporated herein by reference.

TECHNICAL FIELD

The invention relates to a telescopic conveyor belt with a base conveyor section, a telescopic conveyor section which is held on the base conveyor section and which can be moved telescopically in and counter to a direction of extension relative to the base conveyor section, and with an endlessly circulating conveyor belt which forms a conveyor surface and which, with its carrying run, is led along an upper surface of the base conveyor section and the telescopic conveyor section.

BACKGROUND

Such a telescopic conveyor is known for example from EP 1 559 668 B1, and is used in particular for the loading and unloading of storage bays or containers. The intention here is to prevent piece goods, such as for example packages or cartons, from falling off the conveyor. For this purpose, guide sections are known from U.S. Pat. No. 3,127,978 which are fitted along the frame of the conveyor. However, a disadvantage here is that the guide sections did not extend along the individual telescopic conveyor sections.

SUMMARY

The task of the invention consists in providing a telescopic conveyor belt with a lateral guide for transported items, so that these cannot fall off at the sides of the conveyor belt. Here, a compact construction is aimed at, which saves space when the telescopic conveyor is in the retracted state. Furthermore, the aim is to avoid gaps, openings and tapering of the cross-sections, and to reliably prevent smaller items of piece goods or parts thereof, such as for example bands, belts, clasps or the like getting under the conveyor belt.

According to the invention, this problem is solved by a telescopic conveyor belt of this type, which comprises a base guide trough which is closed on the underside and which is arranged between the conveyor belt and the base conveyor section and which has a carrying area for accommodating the conveyor belt and has raised guide areas following on laterally from the carrying area, and a telescopic guide trough which is closed on the underside and which is arranged between the conveyor belt and the telescopic conveyor section and has a carrying area for accommodating the conveyor belt and has raised guide areas following on laterally from the carrying area, wherein the base guide trough is coupled to the base conveyor section and the telescopic guide trough is coupled to an extension end of the telescopic conveyor section, wherein the telescopic guide trough can be extended and retracted telescopically relative to the base guide trough, and wherein the telescopic conveyor belt is adjustable between a nested position, in which the telescopic conveyor section is driven in relative to the base conveyor section and the telescopic guide trough is driven in telescopically relative to the base guide trough, and an extended position in which the telescopic conveyor section is extended at least partially relative to the base conveyor section and the telescopic guide trough is extended at least partially relative to the base guide trough.

It can be envisaged that the carrying area of the base guide trough follows on directly from the guide areas of the base guide trough, or is connected to it over the full length, so that a closed trough shape is formed. It can furthermore be envisaged that the carrying area of the telescopic guide trough follows on directly from the guide areas of the telescopic guide trough or is connected to it over the full length, so that a closed trough shape is formed.

Several consecutive telescopic conveyor sections can be extended and retracted telescopically relative to the base conveyor section, in and counter to the direction of extension, and in particular can be held on it.

Each telescopic conveyor section can be assigned a telescopic guide trough, wherein an end of each telescopic guide trough facing away from the base conveyor section can be coupled to an extension end of the respective telescopic conveyor section.

It can be envisaged that each telescopic conveyor section is assigned several telescopic guide troughs, respectively comprising a pull-out guide trough and at least one sequential guide trough coupled to it, with an end of each pull-out guide trough facing away from the base conveyor section being coupled to an extension end of the respective telescopic conveyor section, and an end of each pull-out guide trough facing the base conveyor section being coupled to a sequential guide trough via a limit stop that limits extension. In the case of several sequential guide troughs per telescopic conveyor section, each additional sequential guide trough is coupled to a sequential guide trough which is adjacent in the direction of the pull-out guide trough, via a limit stop that limits extension.

It is preferably envisaged that each individual guide trough, whether it is a telescopic guide trough, pull-out guide trough or sequential guide trough, is arranged within the next guide trough as seen counter to the pull-out direction, or in the direction of the base conveyor section, whether it is a telescopic guide trough, pull-out guide trough or sequential guide trough, with the guide trough adjacent to the base guide trough being arranged within the base guide trough. Such an arrangement has the advantage that when the telescopic conveyor belt is operated in a preferred direction of conveyance, wherein the carrying run of the conveyor belt moves counter to the direction of extension or, to put it another way, from an extension end of the telescopic conveyor in the direction of the base conveyor section, no hindrance or jamming effect of the steps formed between adjacent guide troughs can occur, since the cross-sectional dimensions of each individual guide trough increase in the direction towards the base guide trough and thus in the preferred direction of conveyance, and do not decrease, as would be the case in a converse arrangement. All such telescopic, pull-out, sequential or base guide troughs have the closed trough shape described above.

For preference, a difference in height between two adjacent guide troughs is no more than twice, 1.5 times or 1 times the material thickness of the carrying area of the resting guide trough.

Carrying areas of adjacent guide troughs can thus rest on one another directly or at a minimal distance. This results in a practically flat conveyor surface, since the material thickness of the carrying areas is very small in relation to its length, for example 5-20 mm with a length of up to 1 meter, 2 meters, 3 meters or more.

It can be envisaged that the carrying areas of adjacent guide troughs in the fully extended state lie at the same height. This can be achieved in that an extension end of a telescopic conveyor section is coupled, with vertical play, to an end of the or a telescopic guide trough or a pull-out guide trough facing the base conveyor section. For this, a vertical slot can be arranged on the telescopic guide trough or on each pull-out guide trough and a fastening bolt that engages through the slot can be arranged on the extension end, or vice versa.

It can furthermore be envisaged that arranged on the base conveyor section is a cap for the raised installation of an end of the base guide trough facing away from the telescopic conveyor section, with the base guide trough having a slope in the direction of the telescopic conveyor section.

In the case of this embodiment, furthermore a wedge element can be held on the base conveyor section such that it can be moved in and counter to the direction of conveyance and is coupled to the or a telescopic conveyor section, wherein in the retracted position the base guide trough, with its end facing the telescopic conveyor section, rests on a starting area of the wedge element at a first height above or immediately on the base conveyor section, and in the extended position the base guide trough, with its end facing the telescopic conveyor section, rests on an end area of the wedge element at a second, greater height above the base conveyor section.

It can be envisaged that the telescopic guide trough is held on the base guide trough such that it can be moved longitudinally by means of guide elements such as rollers or slide pieces.

Accordingly, the or each pull-out guide trough can be held on a sequential guide trough that is coupled to it such that it can be moved longitudinally by means of guide elements such as rollers or slide pieces.

BRIEF DESCRIPTION OF THE DRAWINGS

The invention is explained below on the basis of several design examples, with reference to a drawing, wherein FIG. 1 shows a side view of a first embodiment of a telescopic conveyor belt in the retracted state, FIG. 2 shows the telescopic conveyor belt according to FIG. 1 in the extended state, FIG. 4 shows a perspective view of the transitional area between a telescopic guide trough and a sequential guide trough that is held on it such that it can be moved longitudinally by means of rollers, FIG. 5 shows an enlarged representation of the area indicated by A in FIG. 3, FIG. 6 shows a view corresponding to FIG. 3 for a bearing by means of plastic rails as guide elements, FIG. 7 shows a view corresponding to FIG. 6 without guide elements, FIG. 8 shows a side view of a second embodiment of a telescopic conveyor in the retracted state, FIG. 9 shows a perspective view of the conveyors according to FIG. 8, FIG. 10 shows a side view of the conveyor according to FIGS. 8 and 9 in the extended state, FIG. 11 shows a perspective view of the conveyor according to FIG. 10, FIG. 12 shows a side view of a third embodiment of a telescopic conveyor in the extended state, FIG. 13 shows a perspective view of the telescopic conveyor according to FIG. 12, FIG. 14 shows a side view of a fourth embodiment of a telescopic conveyor in the retracted state, FIG. 15 shows a side view of the conveyor according to FIG. 14 in the extended state, FIG. 16 shows the coupling of the base guide trough to the base conveyor section and the coupling of the pull-out guide troughs to the respective telescopic conveyor sections by means of fastening bolts and slots, by way of the second embodiment as an example, and FIGS. 17-19 show limit stop elements and guide elements in a perspective view, in an enlarged representation and in a cross-sectional view, by way of the second embodiment as an example.

DETAILED DESCRIPTION

Figure 3:
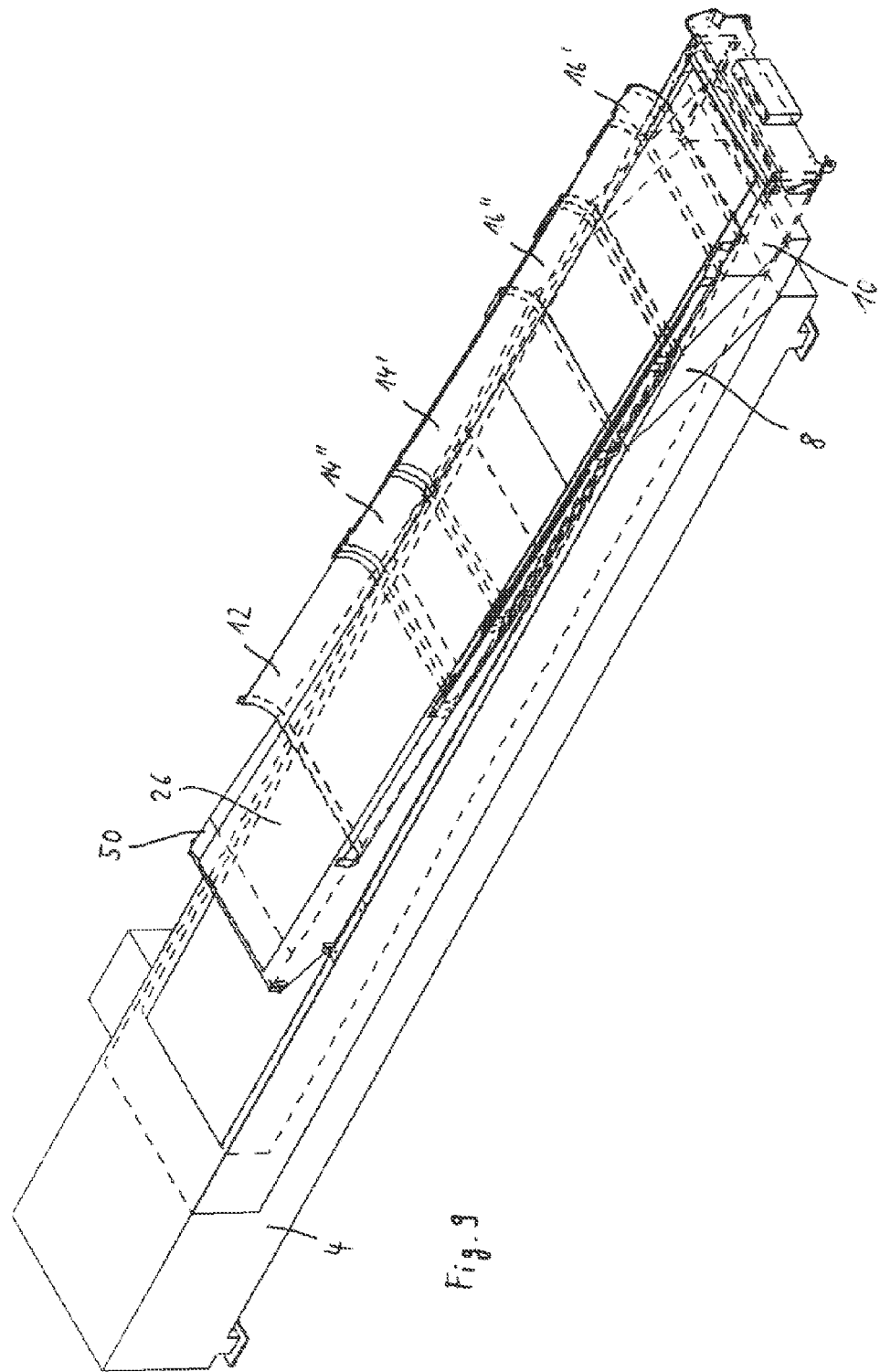
FIG. 3 shows a cross-sectional view of a telescopic guide trough and a sequential guide trough that is held on it such that it can be moved longitudinally by means of rollers.

A first embodiment of the invention is elucidated in FIGS. 1 and 2. A telescopic conveyor belt 2 has a base conveyor section 4, which for example can be formed by a machine frame that can stand on a base or can be moved on it by support elements 6 such as feet, rollers, drive wheels or the like. Borne on or in the base conveyor section 4 is a first telescopic conveyor section 8 which can be extended and retracted in and counter to a direction of extension 7, on which in turn a second telescopic conveyor section 10 can be held such that it can be extended and retracted. Held on the base conveyor section 4 is a base guide trough 12 which is essentially U-shaped in cross-section and which is closed on the underside. Arranged within and above the base guide trough 12 is a first telescopic guide trough 14, within which in turn a second telescopic guide trough 16 is arranged.

The cross-sectional shapes of the base and telescopic guide troughs 12, 14 and 16 follow from FIGS. 3, 6 and 7, which for the sake of simplicity show only two guide troughs 12, 14, arranged within one another, and from which it follows that each guide trough has a carrying area 20, which can be essentially flat, and following on from the carrying area directly at the sides, without any intermediate space or longitudinal gap, raised guide areas 22. All guide troughs thus have a trough shape that is closed on the underside over their whole length, which reliably prevents even small objects from falling out.

A conveyor belt 26, which is shown in FIGS. 3 and 6, but not in FIGS. 1 and 2, is led continuously around the base conveyor section 4 and the telescopic conveyor sections 8, 10, as is generally known in the case of telescopic conveyor belts, with a drive situated within the base conveyor section and a belt storage mechanism with which the alteration of the length of the extended areas of the telescopic conveyor sections can be compensated. A carrying run of the conveyor belt 26 runs on the upper face of the base conveyor section 4 and the telescopic conveyor sections 8, 10, with the guide troughs 12, 14 and 16 being arranged between the conveyor belt 26 and the base conveyor section 4, or the first and second telescopic conveyor sections 8, 10.

The upper surface of the carrying area 20 of the guide troughs 12, 14, 16 thus forms a resting surface for an underside or inner face of the conveyor belt in the area of its carrying run, whilst the guide areas 22 prevent individual piece goods from slipping or falling off the conveyor belt.

In standard operation, the telescopic conveyor 2 works in a direction of conveyance 30 that is orientated counter to the direction of extension 7, wherein the carrying run of the conveyor belt 26 moves in the direction of conveyance 30, so that for example a container that is situated within reach of the extensible telescopic conveyor sections 8, 10 can be unloaded in the direction of conveyance 30. It can of course be envisaged that the direction of conveyance is reversed where necessary.

Whereas the base guide trough 12 is held on or fastened to the base conveyor section 4, the first telescopic guide trough 14, with its rear end 14a as seen in the direction of conveyance 30, is coupled to the first telescopic conveyor section 8, in particular to its extension end 8a. In a corresponding manner, the second telescopic guide trough 16, with its rear end 16a as seen in the direction of conveyance 30, is coupled to the second telescopic conveyor section 10, and in fact expediently to its extension end 10a.

Since the length of the base guide trough 12 essentially corresponds to the length of the base conveyor section 4, the length of the first telescopic guide trough 14 essentially corresponds to an extension distance of the first telescopic conveyor section 8, and the length of the second telescopic guide trough 16 essentially corresponds to an extension distance of the second telescopic conveyor section 10, it is ensured that in each extended position of the telescopic conveyor belt 2, the telescopic guide troughs 12, 14, 16 are arranged at least partially overlapping one another, and form a continuous support surface for the conveyor belt, in the form of the carrying areas 20, and a continuous lower and lateral guide for piece goods, in the form of guide areas 22 and, if applicable, of the lateral edges of the carrying areas 20.

FIGS. 3 to 5 elucidate a first variant of the bearing of the guide troughs which are arranged such that they can be moved longitudinally within one another, wherein for the sake of simplicity only the base guide trough 12 and the first telescopic guide trough 14 are shown. It is pointed out first of all that the carrying area 20 that is shown as flat in FIGS. 3 to 7 can, in principle, have any suitable and expedient form, and can for example be arched in a concave shape, and that the guide areas 22 too can in principle assume any suitable and expedient form, for example they can run vertically (in the vertical direction 32), or can be angled or arched as desired. The guide troughs can comprise metal, plastic or a composite material.

As is shown clearly by FIGS. 4 and 5, the base guide trough 12 that is arranged below and outside the first telescopic guide trough 14 has a guide area 22 which ends open in a vertically upward direction, and on which a horizontal guide flange 22a is arranged. By contrast, the first telescopic guide trough 14 which is arranged above and inside the base guide trough 12 is equipped, at the upper end of its guide area 22, with a guide profile 22b in the shape of an inverted U, which overlaps the guide area 22 of the base guide trough 12, and on which are held the vertical guide rolls 34, which are arranged in pairs and can be rotated around horizontal rotational axes, and the horizontal guide rolls 36, arranged in pairs, which can be rotated around vertical rotational axes. Between the vertical guide rolls 34 one can see the guide flange 22a, on whose end face, facing outwards at the side, the horizontal guide rolls 36 run and prevent any horizontal displacement of the two guide troughs 12, 14 relative to one another.

FIG. 6 shows a variant to the guidance of the guide troughs by means of plastic rails 40 which are fitted to the underside of the first telescopic guide trough 14 and slide on the upper face or inside of the base guide trough 12. Finally, FIG. 7 shows guide troughs that are made of plastic or another readily sliding material, in which separate guide elements such as rollers or plastic rails can be omitted.

FIGS. 8 to 11 elucidate a second embodiment of a telescopic conveyor belt, wherein arranged on the base conveyor section 4 is a cap 50 for the raised installation of a rear end as seen in the direction of extension 7, or of the end 12b of the base guide trough 12 facing away from the telescopic conveyor sections 8, 10, so that the base guide trough 12 has a slope counter to the direction of extension 7 or in the direction of the telescopic conveyor sections 8, 10. In particular, the cap 50 serves the purpose of arranging the discharge end of the telescopic conveyor 2 that is formed by the front end 12b of the base guide trough 12 in a raised position in relation to the base conveyor section 4, so that an additional conveyor can be placed underneath it.

As FIG. 8 shows, in the retracted state it is not only the base guide trough 12 but also the first and second telescopic guide troughs 14, 16 which are telescoped on or in it that assume an inclined position relative to the base conveyor section 4 and the direction of extension 7 of the telescopic conveyor sections 8, 10.

In the case of the embodiment shown in FIGS. 8 to 11, another difference from the first embodiment is that each telescopic conveyor section 8, 10 is assigned not only a telescopic guide trough, but two guide troughs in the form of a first pull-out guide trough 14' that is coupled to the first telescopic conveyor section 8, and a first sequential guide trough 14" that is coupled to that, and in the form of a second pull-out guide trough 16' that is coupled to the second telescopic conveyor section 10, and a second sequential guide trough 16" that is coupled to that. The sequential guide troughs 14", 16" are coupled to the pull-out guide troughs 14', 16' via a limit stop that limits extension. Each sequential guide trough can be borne on the pull-out guide trough that is assigned to it, in accordance with FIGS. 3 to 7.

FIGS. 12 and 13 show a third embodiment, which differs from the second embodiment according to FIGS. 8 to 11 in that on each telescopic conveyor section 8, 10 there is not only a pull-out guide trough and a sequential guide trough coupled to that, but that three guide troughs are provided for each telescopic conveyor section, namely on the first telescopic conveyor section 8 there is coupled to it a first pull-out guide trough 14', a first sequential guide trough 14" that is coupled to that, and in turn an additional first sequential guide trough 14''' that is coupled to that; and on the second telescopic conveyor section 10 there is a second pull-out guide trough 16' that is coupled to that, a second sequential guide trough 16" that is coupled to that, and in turn an additional second sequential guide trough 16''' that is coupled to that. All the sequential guide troughs are coupled to one another and to the respective pull-out guide trough via limit stops that limit extension, and they can be borne on the pull-out guide trough that is respectively assigned, according to FIGS. 3 to 7.

FIGS. 14 and 15 show a fourth embodiment of a telescopic conveyor belt, wherein additionally a wedge element 60 is provided in the area of the base conveyor section 4. FIG. 14 shows the telescopic conveyor belt in the retracted position, whilst FIG. 15 shows the extended position. The wedge element 60 is arranged between the base conveyor section 4 and the base guide trough 12 that is coupled to it, and is connected to the first telescopic conveyor section 8. When the first telescopic conveyor sections 8 is extended relative to the base conveyor section, in the direction of extension 7, the wedge element 60 too is thus displaced in the direction of extension 7 relative to the base conveyor section 4 and the base guide trough 12, and as FIG. 15 shows, it ends up between the first telescopic guide trough 14 and the extended first telescopic conveyor section 8, so that the base guide trough 12 is raised relative to the base conveyor section 4. Optionally, the first sequential guide trough 14" and the first pull-out guide trough 14' can additionally be raised relative to the first telescopic conveyor section 8. This is intended to prevent the belt from sagging.

In contrast to the second embodiment, the telescopic conveyor belt according to the fourth embodiment has not just two but three extensible telescopic conveyor sections, namely a first telescopic conveyor section 8 which can be extended relative to the base conveyor section 4 and which is held on it, a second telescopic conveyor section 10 which can be extended relative to the first telescopic conveyor section 8 and which is held on it, and a third telescopic conveyor section 11 which can be extended relative to the second telescopic conveyor section 10 and which is held on it. Although a first telescopic guide trough could be arranged on the first telescopic conveyor section 8, as in the first embodiment, arranged on it—as in the second embodiment—are a first pull-out guide trough 14' and a first sequential guide trough 14" that is coupled to it, wherein a front end of the first pull-out guide trough 14' as seen in the direction of extension 7 is held on an extension end 8a of the first telescopic conveyor section 8. In a corresponding manner, arranged on the second telescopic conveyor section 10 are a second pull-out guide trough 16' and a second conveyor guide trough 16" that is coupled to it, wherein a front end of the second pull-out guide trough 16' as seen in the direction of extension 7 is coupled to an extension end 10a of the second telescopic conveyor section 10. Furthermore, in a corresponding manner, arranged on the third part conveyor section 11 is a third pull-out guide trough 17' and a third sequential guide trough 17" that is coupled to it, wherein a front end of the third pull-out guide trough 17' as seen in the direction of extension 7 is held on an extension end 11a of the third telescopic conveyor section 11.

In the extended state according to FIG. 13, the wedge element 60 is thus situated between the first telescopic conveyor section 8 and the first pull-out guide trough 14' and the sequential guide trough 14", and raises these from the first telescopic conveyor section 8.

The wedge element 60 has sufficient length so that in the extended state of the telescopic conveyor belt according to FIG. 15, it is situated not only on the first telescopic conveyor section 8, but in part also still on the base conveyor section 4, so that the end 12a of the base guide trough 12 which is facing the telescopic conveyor sections 8, 10, or which is the front end as seen in the direction of extension 7, is also situated on the wedge element 60 and is raised by it. This leads to a height compensation between the base guide trough 12, the first telescopic guide trough 14 (or first pull-out guide trough 14' and first sequential guide trough 14") and the telescopic guide troughs that follow counter to the direction of conveyance 30 and are arranged on the additional telescopic conveyor sections, so that the conveyor belt sags as little as possible and does not have a tendency, even at greater belt tension, to lift away from individual telescopic guide troughs. Smaller items of piece goods thus cannot get under the conveyor belt.

In the case of the first embodiment according to FIGS. 1 and 2, the base guide trough can be firmly fitted to the base conveyor section 4, and the telescopic guide troughs 14, 16 can respectively be connected to the telescopic conveyor sections 8, 10, since the movements in and out do not necessarily lead to changes in the height of the telescopic guide troughs. Nonetheless it can be expedient if the first and second telescopic guide troughs 14, 16 are fitted with vertical play to the telescopic conveyor sections 8, 10, so that the front ends of the telescopic guide troughs 14, 16, as seen in the direction of extension 7, which are held on the extension ends 8a, 10a, have the possibility in the extended state (FIG. 2) of resting on the respective telescopic conveyor section. This would otherwise not be the case, since the first telescopic guide trough 14 lies within and on the base guide trough 12, and the second telescopic guide trough 16 lies within and on the first telescopic guide trough 14, in accordance with FIG. 7, or is supported on it via guide elements in accordance with FIG. 3 or FIG. 6, through which in the extended state a vertical distance necessarily arises between a telescopic conveyor section and a telescopic guide trough arranged above it, which is greater, the more telescopic guide troughs are arranged inside one another or on one another, and the greater their thickness dimensions are. Such a distance is, by contrast, undesirable; rather, the guide troughs should rest on the telescopic conveyor sections.

In order to enable such resting of the telescopic guide troughs on the telescopic conveyor sections, the telescopic guide troughs are held with vertical play at their front end, as seen in the direction of extension, on the telescopic conveyor sections, as shown in FIG. 16. Arranged on the extension end of each telescopic conveyor section 8, 10 is a horizontal fastening bolt 64, which engages into a vertically orientated slot 66 of a respective telescopic guide trough or pull-out guide trough 14', 16', or sequential guide trough. Fitted to the respective front end of the pull-out guide troughs 14', 16' as seen in the direction of extension 7, on both sides of the respective telescopic conveyor section 8, 10, there is in each case a mounting bracket 68, in which a slot 66 is fitted, so that a coupling—can be pivoted around a horizontal transverse axis and which is also height-adjustable—is produced between a pull-out guide trough and a telescopic conveyor section.

In a corresponding manner, in the case of the third embodiment, in which a wedge element 60 is provided, the base guide trough 12 is held with vertical play on the base conveyor section 4, which is likewise shown in FIG. 16. When the wedge element 60 is displaced, the base guide trough 12 is raised or lowered relative to the base conveyor section 4, so that the aforementioned possibility of vertical movement is provided.

FIGS. 17 to 19 elucidate first of all limit stops 70 which set a limit to pulling out, which prevent individual sequential guide troughs from being pulled out excessively in relation to the pull-out guide troughs that carry them. Also shown are lateral guide elements 72 and support guide elements 74, with which individual sequential guide troughs are held such that they can be moved longitudinally on the telescopic conveyor section that supports them laterally and in a resting position. FIG. 19 shows two lateral guide elements 72 and two support guide elements 74 in interaction with a second telescopic conveyor section 10 that is shown as an example.

The present invention thus provides a telescopic conveyor belt, with a base conveyor section, a telescopic conveyor section which is held on the base conveyor section and which can be extended and retracted telescopically, in and counter to a direction of extension, relative to the base conveyor section, an endlessly circulating conveyor belt which forms a conveyor surface and which, with its carrying run, is led along an upper surface of the base conveyor section and of the telescopic conveyor section, a base guide trough which is arranged between the conveyor belt and the base conveyor section and which has a carrying area for accommodating the conveyor belt and has raised guide areas following on laterally from the carrying area, and a telescopic guide trough which is arranged between the conveyor belt and the telescopic conveyor section and has a carrying area for accommodating the conveyor belt and has raised guide areas following on laterally from the carrying area, wherein the base guide trough is coupled to the base conveyor section and the telescopic guide trough is coupled to an extension end of the telescopic conveyor section, wherein the telescopic guide trough can be extended and retracted telescopically relative to the base guide trough, and wherein the telescopic conveyor belt is adjustable between a nested position, in which the telescopic conveyor section is driven in relative to the base conveyor section and the telescopic guide trough (14) is driven in telescopically relative to the base guide trough, and an extended position in which the telescopic conveyor section is extended at least partially relative to the base conveyor section and the telescopic guide trough is extended at least partially relative to the base guide trough.

REFERENCE KEY 2 telescopic conveyor belt
4 base conveyor section
6 support element
7 direction of extension
8 first telescopic conveyor section
8a extension end
10 second telescopic conveyor section
10a extension end
11 third telescopic conveyor section
11a extension end
12 base guide trough
12a rear end
12b front end
14 first telescopic guide trough
14a rear end
14' first pull-out guide trough
14" first sequential guide trough
14''' additional first sequential guide trough
16 second telescopic guide trough
16a rear end
16' second pull-out guide trough
16" second sequential guide trough
16'''' additional second sequential guide trough
17' third pull-out guide trough
17" third sequential guide trough
20 carrying area
22 guide area
22a guide flange
22b guide profile
26 conveyor belt
30 direction of conveyance
32 vertical direction
34 vertical guide roll
36 horizontal guide roll
40 plastic rail (slide piece)
50 cap
60 wedge element
64 fastening bolt
66 slot
68 mounting bracket
70 extension-limiting limit stop
72 lateral guide element
74 support guide element

The invention claimed is:

1. Telescopic conveyor belt, with a base conveyor section, a telescopic conveyor section which is held on the base conveyor section and which can be extended and retracted telescopically, in and counter to a direction of extension, relative to the base conveyor section, an endlessly circulating conveyor belt which forms a conveyor surface and which, with its carrying run, is led along an upper surface of the base conveyor section and of the telescopic conveyor section, a base guide trough which is closed on the underside and which is arranged between the conveyor belt and the base conveyor section and which has a carrying area for accommodating the conveyor belt and has raised guide areas following on laterally from the carrying area, and a telescopic guide trough which is closed on the underside and is arranged between the conveyor belt and the telescopic conveyor section and has a carrying area for accommodating the conveyor belt and has raised guide areas following on laterally from the carrying area, wherein the base guide trough is coupled to the base conveyor section and the telescopic guide trough is coupled to an extension end of the telescopic conveyor section, wherein the telescopic guide trough can be extended and retracted telescopically relative to the base guide trough, and wherein the telescopic conveyor belt is adjustable between a nested position, in which the telescopic conveyor section is driven in relative to the base conveyor section and the telescopic guide trough is driven in telescopically relative to the base guide trough, and an extended position in which the telescopic conveyor section is extended at least partially relative to the base conveyor section and the telescopic guide trough is extended at least partially relative to the base guide trough, and wherein arranged on the base conveyor section is a cap for the raised installation of an end of the base guide trough facing away from the telescopic conveyor section, with the base guide trough having a slope in the direction of the telescopic conveyor section.

2. Telescopic conveyor belt according to claim 1, characterised in that several consecutive telescopic conveyor sections can be extended and retracted telescopically relative to the base conveyor section, in and counter to the direction of extension.

3. Telescopic conveyor belt according to claim 1, characterised in that assigned to each telescopic conveyor section is a telescopic guide trough, with an end of each telescopic guide trough facing away from the base conveyor section being coupled to an extension end of the respective telescopic conveyor section.

4. Telescopic conveyor belt according to claim 1, characterised in that each telescopic conveyor section is assigned several telescopic guide troughs, respectively comprising a pull-out guide trough and at least one sequential guide trough coupled to it, with an end of each pull-out guide trough facing away from the base conveyor section being coupled to an extension end of the respective telescopic conveyor section and an end of each pull-out guide trough facing the base conveyor section being coupled to a sequential guide trough via a limit stop that limits extension.

5. Telescopic conveyor belt according to claim 1, characterised in that an extension end of a telescopic conveyor section is coupled, with vertical play, to an end of a telescopic guide trough or a pull-out guide trough facing away from the base conveyor section.

6. Telescopic conveyor belt according to claim 5, characterised in that a vertical slot is arranged on the telescopic guide trough or on each pull-out guide trough and a fastening bolt that engages through the slot is arranged on the extension end of each telescopic conveyor section, or vice versa.

7. Telescopic conveyor belt according to claim 1, characterised in that on the base conveyor section, a wedge element is held such that it can be moved in and counter to the direction of conveyance and is coupled to the or a telescopic conveyor section, wherein in the retracted position the base guide trough, with its end facing the telescopic conveyor section, rests on a starting area of the wedge element at a first height above or immediately on the base conveyor section, and in the extended position the base guide trough, with its end facing the telescopic conveyor section, rests on an end area of the wedge element at a second height above the base conveyor section, wherein the second height is greater than the first height.

8. Telescopic conveyor belt according to claim 1, characterised in that the telescopic guide trough is held on the base guide trough such that it can be moved longitudinally by means of guide elements.

9. Telescopic conveyor belt according to claim 2, characterised in that assigned to each telescopic conveyor section is a telescopic guide trough, with an end of each telescopic guide trough facing away from the base conveyor section being coupled to an extension end of the respective telescopic conveyor section.

10. Telescopic conveyor belt according to claim 9, characterised in that each telescopic conveyor section is assigned several telescopic guide troughs, respectively comprising a pull-out guide trough and at least one sequential guide trough coupled to it, with an end of each pull-out guide trough facing away from the base conveyor section being coupled to an extension end of the respective telescopic conveyor section and an end of each pull-out guide trough facing the base conveyor section being coupled to a sequential guide trough via a limit stop that limits extension.

11. Telescopic conveyor belt according to claim 9, characterised in that an extension end of a telescopic conveyor section is coupled, with vertical play, to an end of a telescopic guide trough or a pull-out guide trough facing away from the base conveyor section.

12. Telescopic conveyor belt according to claim 2, characterised in that an extension end of a telescopic conveyor section is coupled, with vertical play, to an end of a telescopic guide trough or a pull-out guide trough facing away from the base conveyor section.

13. Telescopic conveyor belt according to claim 2, characterised in that each telescopic conveyor section is assigned several telescopic guide troughs, respectively comprising a pull-out guide trough and at least one sequential guide trough coupled to it, with an end of each pull-out guide trough facing away from the base conveyor section being coupled to an extension end of the respective telescopic conveyor section and an end of each pull-out guide trough facing the base conveyor section being coupled to a sequential guide trough via a limit stop that limits extension.

14. Telescopic conveyor belt according to claim 13, characterised in that an extension end of a telescopic conveyor section is coupled, with vertical play, to an end of a telescopic guide trough or a pull-out guide trough facing away from the base conveyor section.

15. Telescopic conveyor belt according to claim 3, characterised in that each telescopic conveyor section is assigned several telescopic guide troughs, respectively comprising a pull-out guide trough and at least one sequential guide trough coupled to it, with an end of each pull-out guide trough facing away from the base conveyor section being coupled to an extension end of the respective telescopic conveyor section and an end of each pull-out guide trough facing the base conveyor section being coupled to a sequential guide trough via a limit stop that limits extension.

16. Telescopic conveyor belt according to claim 3, characterised in that an extension end of a telescopic conveyor section is coupled, with vertical play, to an end of a telescopic guide trough or a pull-out guide trough facing away from the base conveyor section.

17. Telescopic conveyor belt, with a base conveyor section, a telescopic conveyor section which is held on the base conveyor section and which can be extended and retracted telescopically, in and counter to a direction of extension, relative to the base conveyor section, an endlessly circulating conveyor belt which forms a conveyor surface and which, with its carrying run, is led along an upper surface of the base conveyor section and of the telescopic conveyor section, a base guide trough which is closed on the underside and which is arranged between the conveyor belt and the base conveyor section and which has a carrying area for accommodating the conveyor belt and has raised guide areas following on laterally from the carrying area, and a telescopic guide trough which is closed on the underside and is arranged between the conveyor belt and the telescopic conveyor section and has a carrying area for accommodating the conveyor belt and has raised guide areas following on laterally from the carrying area, wherein the base guide trough is coupled to the base conveyor section and the telescopic guide trough is coupled to an extension end of the telescopic conveyor section, wherein the telescopic guide trough can be extended and retracted telescopically relative to the base guide trough, and wherein the telescopic conveyor belt is adjustable between a nested position, in which the telescopic conveyor section is driven in relative to the base conveyor section and the telescopic guide trough is driven in telescopically relative to the base guide trough, and an extended position in which the telescopic conveyor section is extended at least partially relative to the base conveyor section and the telescopic guide trough is extended at least partially relative to the base guide trough, characterised in that each telescopic conveyor section is assigned several telescopic guide troughs, respectively comprising a pull-out guide trough and at least one sequential guide trough coupled to it, with an end of each pull-out guide trough facing away from the base conveyor section being coupled to an extension end of the respective telescopic conveyor section and an end of each pull-out guide trough facing the base conveyor section being coupled to a sequential guide trough via a limit stop that limits extension.

18. Telescopic conveyor belt according to claim 17, characterised in that each pull-out guide trough that is coupled to the sequential guide trough is coupled such that it can be moved longitudinally by means of guide elements.

19. Telescopic conveyor belt according to claim 17, characterised in that an extension end of a telescopic conveyor section is coupled, with vertical play, to an end of a telescopic guide trough or a pull-out guide trough facing away from the base conveyor section.

20. Telescopic conveyor belt according to claim 10, characterised in that an extension end of a telescopic conveyor section is coupled, with vertical play, to an end of a telescopic guide trough or a pull-out guide trough facing away from the base conveyor section.

* * * * *